US006747660B1

(12) United States Patent
Olano et al.

(10) Patent No.: US 6,747,660 B1
(45) Date of Patent: Jun. 8, 2004

(54) METHOD AND SYSTEM FOR ACCELERATING NOISE

(75) Inventors: Thomas M. Olano, San Francisco, CA (US); Mark S. Peercy, Cupertino, CA (US)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 09/569,521

(22) Filed: May 12, 2000

(51) Int. Cl.[7] .............................. G09G 5/00; G09G 5/02; G06T 1/20
(52) U.S. Cl. .................. 345/582; 345/589; 345/506; 345/601
(58) Field of Search .................. 345/582, 419, 345/589, 601, 506

(56) References Cited

U.S. PATENT DOCUMENTS

| | | | | |
|---|---|---|---|---|
| 5,179,641 A | * | 1/1993 | Comins et al. | 345/443 |
| 5,227,863 A | * | 7/1993 | Bilbrey et al. | 345/723 |
| 5,276,510 A | * | 1/1994 | Cok et al. | 345/168 |
| 5,481,669 A | * | 1/1996 | Poulton et al. | 345/505 |
| 5,546,530 A | * | 8/1996 | Grimaud et al. | 345/505 |
| 5,760,781 A | * | 6/1998 | Kaufman et al. | 345/424 |
| 5,764,233 A | * | 6/1998 | Brinsmead et al. | 345/419 |
| 5,777,619 A | * | 7/1998 | Brinsmead | 345/419 |
| 5,796,407 A | * | 8/1998 | Rebiai et al. | 345/586 |
| 5,973,682 A | * | 10/1999 | Saib et al. | 345/467 |
| 5,973,705 A | * | 10/1999 | Narayanaswami | 345/419 |
| 6,111,584 A | * | 8/2000 | Murphy | 345/582 |
| 6,181,352 B1 | * | 1/2001 | Kirk et al. | 345/506 |
| 6,239,807 B1 | * | 5/2001 | Bossut | 345/582 |
| 6,292,167 B1 | * | 9/2001 | Throup | 345/589 |
| 6,333,744 B1 | * | 12/2001 | Kirk et al. | 345/506 |
| 6,381,364 B1 | * | 4/2002 | Gardos | 382/173 |
| 6,473,091 B1 | * | 10/2002 | Iida et al. | 345/589 |

OTHER PUBLICATIONS

"Spot Noise—Texture Synthesis for Data Visualization", Jarke J. van Wijk, Computer Graphics, vol. 25, No. 4, Jul. 1991, p 309–318.*
"Applications of Pixel Textures in Visualization and Realistic Image Synthesis", Heidrich et al., 1999 Symposium on Interactive 3D Graphics, pp. 127–134.*
"Comparing LIC and Spot Noise", Leeuw et al., Proceedings of the Conference on Visualization, 1998, pp. 359–365, 551.*
"Constructing a realistic head animation mesh for a specific person", Neumann et al., 1999, Integrated media systems center, USC.*

* cited by examiner

Primary Examiner—Mark Zimmerman
Assistant Examiner—Ryan Yang
(74) Attorney, Agent, or Firm—Woodcock Washburn LLP (57) ABSTRACT

One aspect of the invention is a method for accelerating noise. The method includes the step of creating a plurality noise texture values ($n_1, \ldots, n_n$) each corresponding to one of a plurality of image pixel values ($x_1, \ldots, x_n$). The method also includes invoking at least a portion of a graphics pipeline (17) to blend each of the plurality of image pixel values ($x_1, \ldots, x_n$) with one of the plurality of noise texture values ($n_1, \ldots, n_n$).

32 Claims, 3 Drawing Sheets

METHOD AND SYSTEM FOR ACCELERATING NOISE

TECHNICAL FIELD OF THE INVENTION

The present invention relates in general to image graphics and more particularly to a method and system for accelerating noise.

BACKGROUND OF THE INVENTION

Graphics rendering and other visualization applications typically utilize accelerated hardware, firmware, and sometimes even software modules to perform compute-intensive rendering operations. These applications also utilize a graphics system interface such as OPENGL® or DIRECT3D® to control low-level graphics drawing operations in these accelerated modules. These operations include, but are not limited to, polygon specification and transformations, basic lighting control, and frame buffer operations such as blending and depth-buffering. Transformations usually correctly position one or more three-dimensional objects and then apply lighting and/or textures using the correct size and angles. OPENGL® utilizes a variety of low-level models such as textures, which may be defined for objects within scenes, and lighting models, which may define light sources and the manner in which surfaces in the scenes reflect light therefrom. Unfortunately, any increase in the quality of an object's appearance is typically associated with a decrease in processing speed, which is undesirable, especially for interactive applications.

Programmable or procedural shading applications usually allow an artist or technical director to control appearances of objects by using complex effects such as blending, shading, and texturing. For example, the artist may introduce a noise function to give bricks or sand a visually pleasing appearance. However, most noise functions used in conventional systems are typically either of poor quality and/or are non-accelerated and extend processing time. For example, many conventional systems implement value noise functions, which typically introduce artifacts or other unnatural or non-random effects. These effects produce images of inferior quality, because they are visually displeasing to most viewers. Other systems may implement gradient noise functions, but these systems do not implement these noise functions in accelerated hardware, firmware and/or software modules. As a result, these systems suffer from a processing speed that is typically slower than those systems which are able to accelerate the noise functions. In addition, these noise functions are typically not compatible with graphics system interfaces such as OPENGL®.

Furthermore, many of these accelerated modules are constrained to fixed point pixel values at one or more points in the image pipeline. For example, pixel data values during rasterization and in a frame buffer are typically restricted or clamped by a graphics system interface between zero and one. This compression of pixel values may reduce the accuracy to which light and/or color may be displayed and/or processed. This compression of values typically limits the accuracy and flexibility with which the appearances of objects, such as their texture, may be represented.

SUMMARY OF THE INVENTION

From the foregoing, it may be appreciated that a need has arisen for improving the speed at which noise may be introduced into graphics processing to produce visually pleasing images. In accordance with the present invention, a method and system for accelerating noise are provided that substantially reduce or eliminate disadvantages and problems of conventional systems.

One aspect of the invention is a method for accelerating noise. The method includes the step of creating a plurality of noise texture values that each correspond to a plurality of image pixel values. The method also includes invoking at least a portion of a graphics pipeline to blend the plurality of noise texture values with a plurality of image pixel values.

The invention provides several important advantages. Various embodiments of the invention may have none, some, or all of these advantages. The invention may accelerate various forms of noise functions including, but not limited to, band-limited and gradient noise. Such an advantage may improve the quality of the appearance of a scene and objects therein. For example, the invention may be used to control the introduction of noise into surface shading functions. The present invention allows OPENGL® to be used as a single-instruction multiple-data (SIMD) computing surface. Such an advantage may allow noise to be applied using procedural texturing, shading, and noise synthesis on a per-pixel basis using multiple passes through a graphics pipeline.

In addition, the invention may also allow control of system resource allocation. For example, the quality of procedural algorithms such as shaders may be traded off with the quality of noise used. Thus, resources may be allocated as desired by selection of shaders and/or noise functions. Furthermore, many forms of noise functions including, but not limited to, various dimensional inputs (e.g., one- to four-dimension), single value or color, and periodic noise functions, may be efficiently implemented using a variety of methods in conjunction with a graphics system interface such as OPENGL®. The invention may be used with a variety of existing systems with little impact on the speed of processing. The invention may also allow such noise to be introduced procedurally, increasing the flexibility of the programmable environment.

The invention may also be used to implement higher resolution values for applying textured noise values to image pixels. The invention may also represent pixel values as an index to a texture value. Such an advantage allows more detailed textures to be applied to image data and avoids these texture values from being clamped in the acceleration modules. Such an advantage may also minimize any loss in the precision of computed texture values, improve the quality of the resultant images by improving the accuracy to which light and/or color may be displayed and/or processed.

BRIEF DESCRIPTION OF THE DRAWINGS

For a more complete understanding of the present invention and the advantages thereof, reference is now made to the following description taken in conjunction with the accompanying drawings, wherein like reference numerals represent like parts, and in which.

DETAILED DESCRIPTION OF THE INVENTION

Figure 1:
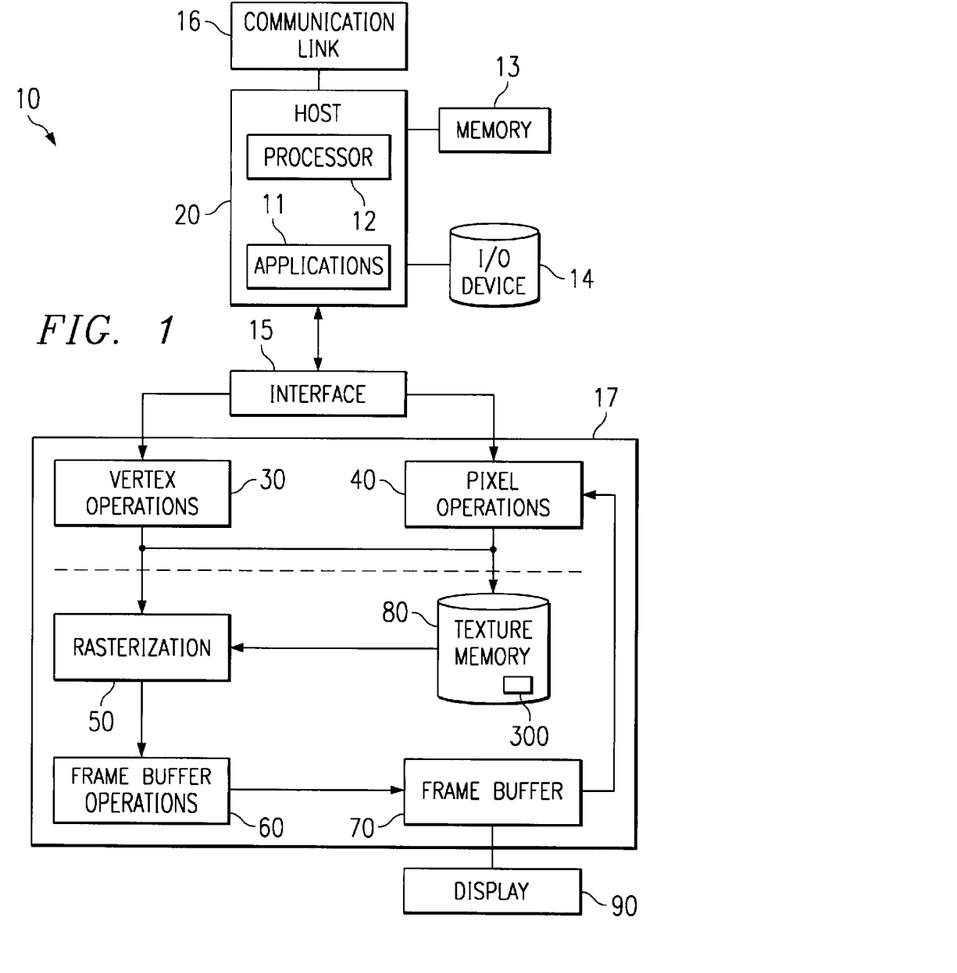
FIG. 1 is a block diagram of a graphics system.

FIG. 1 is a block diagram of a graphics system 10. Graphics system 10 includes a host 20 coupled to a graphics system interface 15 which couples to a graphics pipeline 17. Host 20 may be a general or a specific purpose computer and includes a processor 12 and a memory 13, which may include random access memory (RAM) and read only memory (ROM). Specifically, host 20 may be used to execute applications 11 having image graphics and visualization software that may be stored in memory 13 and/or an input/output device 14. Results may be displayed using display 90 and/or stored in input/output device 14, which may be any suitable storage medium. Data processing may be performed using special purpose digital circuitry contained either in host 20 or in a separate device. Such dedicated digital circuitry may include, for example, application-specific integrated circuitry (ASIC), state machines, fuzzy logic, as well as other conventional circuitry. Host 20 may also include a portion of a computer adapted to execute any of the well known MS-DOS, PC-DOS, OS2, UNIX, MAC-OS, and Windows operating systems or other operating systems including unconventional operating systems. Host 20 may also be coupled to a communication link 16 that may be connected to a computer network, a telephone line, an antenna, a gateway, or any other type of communication link.

Interface 15 may be any software graphics or firmware interface such as OPENGL® or DIRECT3D® that includes procedures and functions and that may be used to control low-level operations in graphics pipeline 17. In operation, interface 15 is operable to control the processing of image data in graphics pipeline 17 in response to selected commands that are passed from application software 11 such as a programmable shader. Data is passed through some or all of the elements in graphics pipeline 17 and may then be transferred from frame buffer 70 to display 90 for viewing. For example, pixels may be written to and read from frame buffer 70 using OPENGL® function calls such as the DrawPixels and ReadPixels command, and the function CopyPixels can be used to copy a block of pixels from one region of frame buffer 70 to another. Each image pixel may be monochromatic, or include one or more of the rgb pixel color values corresponding to the three color channels (usually red, green, and blue).

More specifically, graphics pipeline 17 includes a vertex operations module 30 and a pixel operations module 40. Vertex operations module 30 and pixel operations module 40 are each coupled to a rasterization hardware 50. Rasterization hardware 50 is coupled to a frame buffer operations module 60, which in turn is coupled to a frame buffer 70. Frame buffer 70 may couple to pixel operations module 40. Pixel operations module 40 is also coupled to a texture memory 80, which is also coupled to rasterization hardware 50. Graphics pipeline 17 may include software, firmware, hardware, or a combination thereof. Interface 15 may be a standalone module, reside on host 26, or a combination thereof.

It may be helpful to illustrate a single pass through graphics pipeline 17. Because interfaces 15 such as OPENGL® are procedurally based, graphics pipeline 17 performs those low-level operations on all of the pixels passed in response to the OPENGL® procedure or function call. Host 20 sends image data to pixel operations module 40, which may utilize a lookup table to apply a scale or bias such as a color contrast or brightness to pixels passed thereto. Host 20 also sends geometry data to vertex operations module 30. The geometry data usually includes texture coordinates or vertices (s,t,r,q) that are projected points that correspond to a location (x,y,z,w) in an image plane. The geometry data may also include normals at each of these vertices for each of the three color channels. Vertex operations module 30 transforms geometry into a raster coordinate system. Usually, this includes tessellation, or breaking down a continuously smooth surface into triangular surfaces. Rasterization hardware 50 usually interpolates the tessellated vertices to populate the pixels within each of these surfaces. In some applications, rasterization hardware 50 may also request a texture map from texture memory 80. In some applications, this texture map may be a noise function stored as a texture in a lookup table 300. Lookup table 300 may be implemented in a variety of ways, such as providing an index from each of a plurality of input random values to an output noise texture value. This texture map may then be applied to all of the pixels in rasterization hardware 50. These pixels are then passed to frame buffer 70.

Frame buffer operations module 60 then may perform a variety of functions on the data passed from rasterization hardware 50 and then pass this data to frame buffer 70. Some of these functions include, but are not limited to, a depth test, stencil test, and blending, and are performed on all of the pixels passed to frame buffer operations module 60. A depth test typically discards portions of an image region that fail a depth comparison. For example, the depth test may be used to clip surfaces that are further from, or are obstructed by, an object that is nearer in a field of view. A stencil test may be used as an arbitrary comparison that allows selected pixels to be rejected based on the outcome of a comparison between the value in the stencil buffer and the reference value, usually an integer. Blending usually includes operations that may be performed on the pixels in the frame buffer, such as adds, subtracts, multiplies, or clears, and is typically used when assigning color values to pixels.

System 10 may also utilize a mechanism such as an alpha channel in graphics pipeline 17 to select or exclude any portion or region of pixels as desired. The alpha channel typically passes one to three color values and is typically used for blending operations to indicate the transparency of one or more of these colors. The alpha channel may also be used in combination with an alpha test to perform per pixel exclusions in circumvent any implementation-specific requirements imposed on textures by procedures in interface 15. An alpha test may be controlled by using an AlphaFunc to discard portions of an image conditional on the outcome of a comparison between the incoming portion's alpha value and a constant value. For example, a desired region may be selected and copied using OPENGL's® Copy Function with alpha test enabled. Those pixels that pass the condition are copied in the alpha channel and activate the stencil bit, thus passing the pixels within the desired region. This process may be used in several passes through graphics pipeline 17 to build up the result in the alpha channel (more generally in frame buffer 70). More generally, any color channel may be used to set a color, and then these pixels values may be copied to the alpha channel. An operation may be performed for each of the three color channels. When frame buffer 70 has performed this operation on all of the pixels, the pixels are usually sent to a display 90.

Where programmable applications 11 such as shading algorithms are used to model the appearance of objects, an artist typically describes the appearance of one or more portions of an image by selecting those pixels that should be altered. For example, a programmable shading algorithm may be used to provide various atmospheric, light, shading, surface details, textures, and/or colors for each point on a surface. These functions may parameterize the appearance of selected objects using, for example, a surface normal, texture coordinates, texture maps, light direction, and colors.

For example, programmable applications 11 such as the RenderMan shading language may be used in conjunction with an interface 15 such as OPENGL® to generate a noise function. This noise function may be used to alter image pixels so that the resultant noisy image contains what appears to be, for example, randomly-distributed grains of sand on a beach. An interface 15 such as OPENGL® may be used as a SIMD computing surface to alter image pixel values in multi-pass operations to provide the requested sandy appearance in accordance with the method provided below. Such an advantage accelerates the process of producing the noisy image by utilizing the speed of graphics pipeline 17.

In general, a noise function may be provided as a texture that may be blended with image pixel values using multi-pass operations. This noise function may desirably be a fourth-order blend of random values, where each input random value results in the same output noise value. Conversely, different input random values result in different output noise values. A noise function n is a function of at least one of (x,y,z,t) and is preferably generally smooth and continuous between a specified set of points. The noise function includes a component such as a gradient that is generated randomly. The noise function may be value, gradient and/or band-limited noise, which result in a range of appearances. Typically, gradient and band-limited noise have fewer visible artifacts, and thus appear more visually pleasing. In addition, a noise function may be of different forms including, but not limited to, those with one- to four-dimensional inputs. Furthermore, a noise function may be of a different result type including, but not limited to, single value or color, and may or may not include a user-specified period.

A variety of gradient noise functions and methods used to efficiently accelerate them are discussed in conjunction with FIGS. 2A–4. An output noise function value may be identified by using a kernel function and a lattice of gradient values that bounds the input image pixel values. For example, lattices may be formed by uniformly distributed pseudorandom gradient values at integer coordinates and may be used to determine the behavior of the noise function between the lattice points. A noise function may be limited in range to improve the controllability of the contribution of the noise function with respect to a given input value. This controllability may improve the appearance of a resultant noisy image.

FIGS. 2A–3B graphically illustrate and discuss examples for implementing one-, two- and multi-dimensional noise functions that may be generated as noise textures. FIG. 4 discusses one method that may generate and/or apply these noise textures to alter image pixel values in graphics pipeline 17. In some applications, it may also be desirable to improve the accuracy of the noise textures to improve the appearance of a final image. One method for such an improvement is illustrated and discussed in conjunction with FIGS. 5A–6.

Figure 2A:
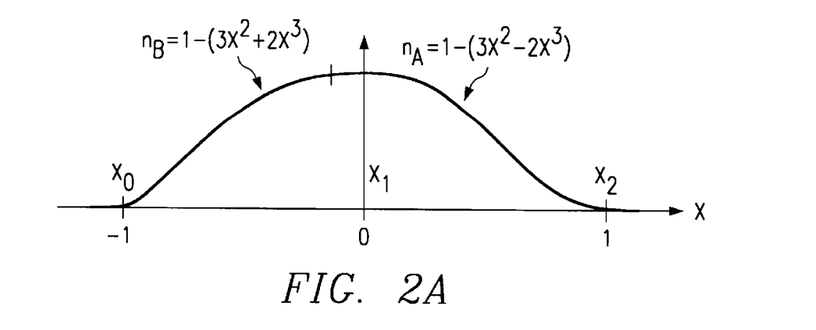
FIG. 2A graphically illustrates examples of one-dimensional falloff kernel noise functions.

FIG. 2A graphically illustrates examples of one-dimensional falloff kernel noise functions. Three lattice points $x_0$–$x_2$ are used to illustrate one aspect of the invention. Falloff kernel functions and noise functions n resulting therefrom are desirably smooth between lattice points $x_0$–$x_2$ so that values of n at nearby or neighboring values of x will be generally similar, which reduces discontinuities between the points and results in a visually pleasing appearance. Falloff and gradient kernel functions may be built to a desired range of influence, with an element of controllability. For example, a cubic equation may be used to generate pleasing visual effects, and to illustrate one example of a falloff kernel function. A cubic equation may be used to control the contribution of the noise function around a desired point.

Figure 2B:
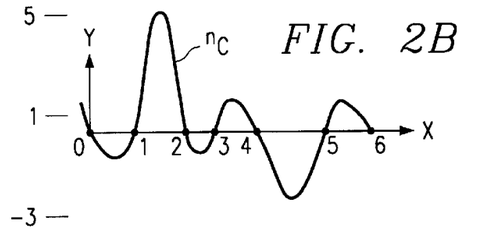
FIG. 2B graphically illustrates an example of a composite one-dimensional band-limited gradient noise function.
Figure 2C:
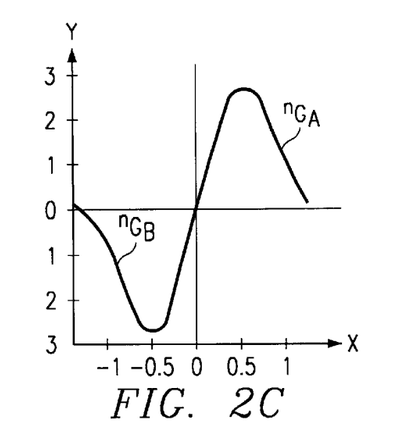
FIG. 2C graphically illustrates examples of one-dimensional gradient kernel functions that may be obtained by using the falloff kernel functions of FIG. 2A.

Computation of a single value for a noise function by using falloff and gradient kernel functions as described in conjunction with FIGS. 2A, 2B and 2C may be illustrated by using examples for first- and second-stage falloff kernel functions defined for regions between respective points [0,1] and points [−1,0], for simplicity. These functions may also be scaled and translated to be applicable to other regions. Gradient values to be used with these kernel functions may be interpolated for input image pixel values by utilizing contributions from the falloff kernel function defined for lattice points that bound the input image pixel value. For example, the distance from a noise function defined for a region greater than (in FIG. 2A, to the right of) a lattice point may be computed using a first-stage falloff kernel function, and the contribution from a noise function defined for a region less than (in FIG. 2A, to the left of) the lattice point may be computed using a second-stage falloff kernel function. The contribution may then be combined to provide a total noise contribution. In some applications, values for these distances may then be saved in, for example, lookup tables for easy access.

FIG. 2A illustrates a pair of falloff kernel functions defined around a desired point $x_1$=0. For example, a cubic falloff kernel function defined for the range [0,1] may be defined by four conditions and may be represented by the following equation:

$$\text{first-stage falloff kernel function } n_A=1-(3x^2-2x^3). \tag{1}$$

Four exemplary conditions may require, for example, that equation (1) yields a value of one at $x_1$=0 and a value of zero at $x_2$=1, and that the slope of the equation (the gradient) be zero at both $x_1$=0 and at $x_2$=1, as illustrated in FIG. 2A. Such conditions provide a very localized maximum at $x_1$=0 while reducing the contribution of the function to zero at $x_2$=1. These conditions advantageously provide smooth behavior that eliminates visually displeasing effects such as discontinuities. They may also eliminate any additional contribution of the function to values of x>1.

This function may then be reflected about the desired point $x_1$=0 to provide a second-stage falloff kernel function $n_B$=1−($3x^2+2x^3$) for the region [−1,0]. The function retains the four exemplary conditions as discussed above. That is, the localized maximum=one at $x_n$=0 while the contribution of the function is reduced to zero at $x_0=-1$, and the slope of the equation=zero at $x_1=0$ and $x_0=-1$.

FIG. 2B graphically illustrates an example of a composite one-dimensional band-limited gradient noise function that may be constructed using the falloff kernel illustrated in FIG. 2A. This composite one-dimensional noise function $n_C$ may include a plurality of gradient kernel functions, which are each a falloff kernel function that has been multiplied by a gradient value or slope to control the slope and scale of the composite noise function. Noise function $n_C$ includes weighted sums of gradient kernel functions that have been shifted along the x axis to each contribute to desired points x=1,2,3, and so on. For example, noise function $n_C$ has negative slopes at x=0, 2, 4, and 6, and positive slopes at x=1, 3, and 5. In addition, the first- and second-stage falloff kernel functions defined for x=2 have been scaled to reach a noisy value $n_C$ of 5.

Noise function $n_C$ may be implemented using a variety of methods. For example, noise function $n_C$ may be constructed by selecting the gradient to pass through a constant value level at each lattice point. These gradients may be selected using a variety of methods, including the method described by Ken Perlin and Eric M. Hoffert in *Computer Graphics*, Vol. 23, # 3, July 1989, pp. 253–262, which is hereby incorporated by reference. In addition, each of these gradients may be connected in many ways, including splines and line segments. Line segments used to connect the gradients produce value noise that typically contains visual artifacts, such as patterned lines, which are typically displeasing in appearance. On the other hand, splines used to connect the gradients produce gradient noise that appears more smooth and is generally pleasing in appearance.

To illustrate, each cubic kernel function may be multiplied by a gradient value $v_{grad}$, or slope (e.g., $v_{grad}$ may be represented here by the equation y=x), to control the slope of and to scale the final noise function $n_C$. This creates a fourth order noise function that provides more controllability of the final image appearance. For example, a gradient of 1 multiplied by first-stage falloff kernel function $n_A$ of FIG. 2A yields the gradient kernel function $n_{GA}$ as illustrated in FIG. 2C:

$$\text{gradient kernel function } n_{GA}=x(1-3x^2+2x^3). \quad (2)$$

Similarly, a gradient of 1 multiplied by second-stage falloff kernel function $n_B$ of FIG. 2A yields the gradient kernel function $n_{GB}$ as illustrated in FIG. 2C, which may be expressed as $n_{GB}=x(1-3x^2+2x^3)$. Composite noise function $n_C$ may then be obtained by scaling and/or combining one or more gradient kernel functions such as $n_{GA}$ and $n_{GB}$ to emphasize one or more of these different scaled noise functions over another. For example, band-limited noise may be formed by utilizing gradients that result in an output noise function having a limited frequency of one-half to one cycle between lattice points. Such band-limited noise functions may be obtained by, for example, multiplying one of the falloff kernel functions illustrated in FIG. 2A by a scalar such as 2, resulting in a gradient kernel function with a higher amplitude. Final noise functions may be regular or periodic noise ("pnoise"). Pnoise provides a periodic noise function that repeats at least one cycle over an image portion, and may vary as a function of a number of parameters. For example, pnoise (256) is periodic every 256 lattice points.

Two falloff kernel function values may be computed for an input image pixel value by assessing the contributions from two falloff kernel functions at a distance d from each of two gradient lattice points that bound the input image pixel value. For example, an input image pixel value of 0.75 would be calculated using kernel functions defined for the region [0,1]. That is, would be calculated for the first-stage noise function defined to the right of the desired point x=0 at the value x=0.75−0.0=0.75. Thus, for x=0.75, first-stage falloff kernel function value $n=1-3x^2+2x^3$, or $n=1-3*(0.75)^2+2*(0.75)^3$. Similarly, the value may be calculated for the second-stage falloff kernel function defined to the left of the desired point x=1 at the value x=0.75−1.0=−0.25. Thus, for x=−0.25, second-stage falloff kernel function value $n=1-3x^2-2x^3$, or $n=1-3*(-0.25)^2-2*(-0.25)^3$. The final noise contribution may then be calculated using these values scaled by corresponding gradient values, using a method similar to the one discussed in conjunction with FIG. 4. These values may alternatively be calculated using gradient kernel functions.

Figure 3A:
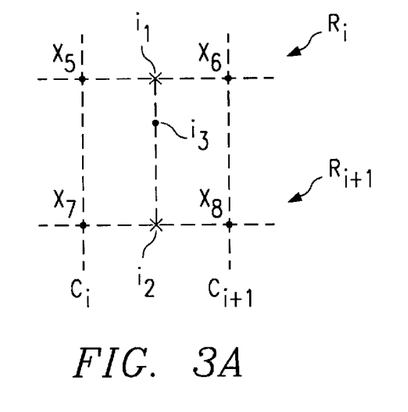
FIG. 3A graphically illustrates a two-dimensional lattice that may be used to illustrate examples for implementing a two-dimensional noise function.
Figure 4:
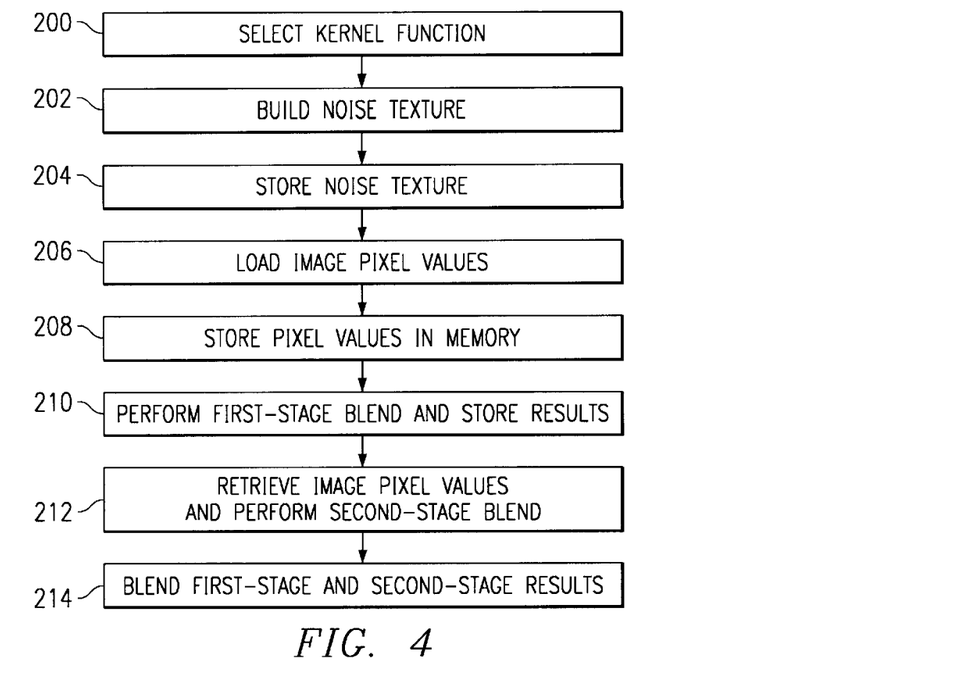
FIG. 4 illustrates an example of a method that may be used to accelerate noise.

FIG. 3A graphically illustrates a two-dimensional configuration of lattice points $x_5-x_8$ that may be used to illustrate examples for implementing a two-dimensional noise function. The first- and second-stage kernel functions are functions of x and y as input values. These kernel functions may be similarly constructed as discussed above, with slope=zero where x and y are both integers, and described as one-dimensional cubic functions in both an x and a y dimension. The falloff kernel functions each have a value of one at a desired point and zero at an edge. The noise function may include a plurality of weighted gradient kernel functions that may each be obtained by multiplying a falloff kernel function by a gradient $v_{grad}$. Here, the gradient $v_{grad}$ may be, for example, represented by the equation z=x in the x dimension, and by the equation z=y in the y dimension.

For example, a two-dimensional noise function n may be visualized similarly to the one-dimensional noise function discussed above. These four lattice points $x_5-x_8$ represent image pixel units in two dimensions, illustrated here in an x-y plane, and may be used to illustrate one aspect of the invention. That is, lattice points $x_5$ and $x_6$ may reside at the same x value, and lattice points $x_7$ and $x_8$ may reside in another x value. Lattice points $x_5$ and $x_7$ and lattice points $x_6$ and $x_8$ reside respectively in adjacent y values. A two-dimensional texture may be constructed by determining gradients that are valid in both the x and y dimensions.

To define texture values for noise function n between lattice points $x_5-x_8$, a first interim point $i_1$ may be interpolated between lattice points $x_5$ and $x_6$, and a second interim point $i_2$ may be interpolated between lattice points $x_7$ and $x_8$. A final gradient value $i_3$ may then be interpolated between interpolated points $i_1$ and $i_2$.

Figure 3B:
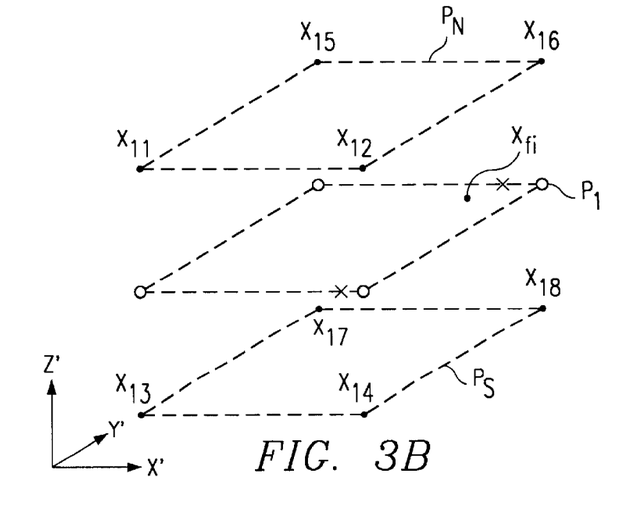
FIG. 3B graphically illustrates a three-dimensional lattice that may be used to illustrate several examples for implementing multi-dimensional noise functions.

FIG. 3B graphically illustrates a three-dimensional configuration of lattice points in the x, y and z dimensions designated $x_{11}-x_{18}$ that may be used to illustrate several examples for implementing multi-dimensional noise functions. These lattice points may be used to illustrate several aspects of the present invention. First- and second-stage kernel functions are functions of x, y, and z as input values. These kernel functions may be similarly constructed as discussed above with slope=zero where x, y, and z are both integers, and described as one-dimensional cubic functions in an x, y, and z dimension. The kernel functions each have a value of one at a desired point and zero at an edge. Each falloff kernel function may be multiplied by a gradient $v_{grad}$ such as $v_{grad}=x$ in the x dimension, $v_{grad}=y$ in the y dimension, and $v_{grad}=z$ in the z dimension to obtain a gradient kernel function from which the noise function may ultimately be derived, as discussed above.

For example, a three-dimensional noise texture may be computed using lattice points $x_{11}-x_{18}$. To illustrate, gradients having x, y and z components may be computed by determining intermediate values similar to those discussed above in conjunction with a two-dimensional noise function. That is, a three-dimensional texture may be constructed by determining gradients that are valid in each of the x, y, and z dimensions. In this application, intermediate points in a designated z-plane may be determined by blending respective lattice point pairs $x_{11}$ and $x_{13}$, $x_{12}$ and $x_{14}$, $x_{15}$ and $x_{17}$, and $x_{16}$ and $x_{18}$, a total of four blends. These points are determined by establishing interpolated points designated by circles for a value z that lie in x-y plane $P_1$ in FIG. 3B. These points conceptually establish, for example, plane $P_1$ between a north x-y plane $P_n$ formed by lattice points $x_{11}$, $x_{12}$, $x_{15}$ and $x_{16}$ and a south x-y plane $P_s$ formed by points $x_{13}$, $x_{14}$, $x_{17}$, and $x_{18}$. Similarly, as discussed above in conjunction with FIG. 3A, these four points forming interpolated plane $P_1$ may be blended to reach one final gradient value $x_{fi}$ in plane $P_1$ by three further blends.

The method discussed above in conjunction with two- and three-dimensional noise may also be extended to provide a result for the four-dimensional case. For example, a four-dimensional (x,y,z,t) lattice (not explicitly shown) may be reduced to a three-dimensional (x,y,z) lattice by establishing interpolated points for a value t that lie in an x,y,z region. A final gradient value may then be provided by following methods similar to those discussed in conjunction with FIGS. 2A–3B.

As discussed in conjunction with FIGS. 2–3B, a gradient value may be derived using a number of blends, depending on the desired noise. For example, the number of blends that may be performed to arrive at a single gradient value may be represented by the relationship $2^n-1$. For example, for one-dimensional noise, a single blend may be performed. Similarly, for two-, three-, and four-dimensional noise, three, seven, and fifteen blends respectively may be performed. These values may be computed as needed in a method such as the one discussed in FIG. 4, or computed and stored for later retrieval.

FIG. 4 illustrates an example of a method that may be used to accelerate noise. Noise may be generated as discussed in conjunction with FIGS. 2A–3B, and blended with image data to alter the appearance of the image data. Although steps 200–212 are illustrated as separate steps, various steps may be ordered in other logical or functional configurations, or may be performed as single steps. The method may be performed using graphics pipeline 17 in a SIMD configuration using an application 11 such as the RenderMan shading language.

The noise functions discussed above are typically a fourth-order blend of alpha and color values that may be represented as a bilinear weighted sum of gradient values with values computed from a kernel function. For example, a one-dimensional noise function value n for an input image pixel value x (represented by rgb values) may be represented by a fourth-order blend as $\alpha_0 * r_0 g_0 b_0 + \alpha_1 * r_1 g_1 b_1$. That is, the alpha channel may include the values for a first-stage kernel function $\alpha_0$ and a second-stage kernel function $\alpha_1$, and the gradient values may be included in the corresponding rgb values.

In step 200, a kernel function such as the one discussed in conjunction with FIG. 2A or 2C may be selected. This kernel function may be used to build noise texture n in step 202, using a variety of methods. For example, noise function n=noise(x) may be computed as texture values to any desired accuracy, depending on system requirements such as memory. Noise function n may be stored as texture values in, for example, pixel operations module 40 or texture memory 80 for application during rasterization processing. In addition, it may be desirable in some applications for noise function n to be implemented by using a lookup table such as lookup table 300 illustrated in FIGS. 1 and 6. For example, each value x may be an index to a one-dimensional texture lookup table 300 for texture value n. Such an implementation may be efficient, and thus reduce processing time. In addition, each value n may be computed as an extended range pixel value to improve the appearance of the final texture. Two methods for representing pixel values with extended ranges are discussed in conjunction with FIGS. 5A and 5B. Alternatively or in addition, noise texture n may be computed as needed during one or more passes in graphics pipeline 17.

In step 204, a noise texture n built in step 202 may also optionally be stored using a variety of methods. For example, noise texture n may be stored in texture memory 80, in a structure such as lookup table 300, as discussed above. Alternatively or in addition, kernel function values and/or gradient values may be stored as one or more lookup tables 300 that may be used in various passes in graphics pipeline 17 to build a final noise texture n that is ultimately applied to image values.

Figure 6:
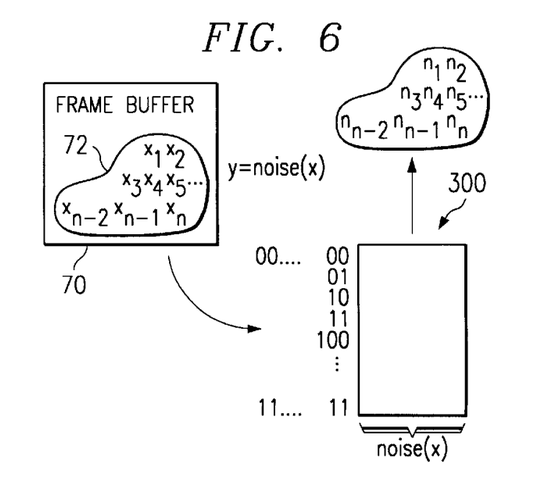
FIG. 6 graphically illustrates a method for representing extended range textures.

In step 206, image pixel values are passed from host 20 to graphics pipeline 17 for processing. These pixel values are copied from frame buffer 70 to a storage medium such as texture memory 80 in step 208 to preserve them for the second-stage blend. In step 210, each image pixel value $x_1, \ldots, x_n$ as illustrated in FIG. 6 may be blended with corresponding noise texture n=noise(x) to provide first-stage blend results $\alpha_0 r_0 g_0 b_0$ and a second-stage blend results $\alpha_1 r_1 g_1 b_1$. That is, for example, noise texture n may be stored in the alpha channel of frame buffer 70 and blended with each of the RGB values that represent each image pixel value $x_1, \ldots, x_n$. In some applications, this blend may be performed in a number of steps.

An example using a single pixel value x may be illustrative. For an image pixel value $x_1=0.75$, a first-stage kernel function value between values [0,1] may be retrieved or computed and stored in alpha channel $\alpha_0$ on a first pass through graphics pipeline 17. In a second pass, this $\alpha_0$ value may be scaled by a gradient that may be retrieved or computed. In some applications, these gradient values may be found in a separate or the same lookup table 300. As one example, this gradient table may include three separately randomly generated gradient values $r_0 g_0 b_0$, one for each image pixel color value. In a fourth pass, values $r_0 g_0 b_0$ may be blended with $\alpha_0$ to provide the first-stage blend $\alpha_0 r_0 g_0 b_0$ and stored in a storage medium such as texture memory 80. A similar process may be performed in step 212 to perform the second-stage blend $\alpha_1 r_1 g_1 b_1$. For example, the image pixel values originally passed from host 20 may be retrieved from texture memory 80, and a kernel function value may be retrieved or computed and stored in the alpha channel $\alpha_1$. In a next pass, $r_1 g_1 b_1$ values may be retrieved or computed, and then blended with $\alpha_1$ to provide second-stage blend $\alpha_1 r_1 g_1 b_1$.

In step 214, the first-stage results $\alpha_0 r_0 g_0 b_0$ may be retrieved from texture memory 80 and then be blended with the second-stage results $\alpha_1 r_1 g_1 b_1$ for the image pixel value in an eighth pass through graphics pipeline 17 to produce a final texture that represents noisy image pixel value n.

Steps 206–214 are performed approximately simultaneously for all image pixel values $x_1, \ldots, x_n$ in frame buffer 70. That is, the method describes generating the first- and second-stage $\alpha$ and rgb values for the plurality of image pixels $x_1, \ldots, x_n$. In various embodiments, steps 200–214 may be performed with slight variations to optimize performance. For example, various implementations may be used to minimize the number of passes through graphics pipeline 17, which may reduce computation time. Other implementations may utilize less memory and/or computing resources. For example, steps 200–214 describe generally a method that may be used to implement any dimensional noise function, whether or not the function is periodic. The final noisy texture may be represented by a bilinear weighted sum of two noise texture contributions (e.g., $a_0 * r_0 g_0 b_0 + a_1 * r_1 g_1 b_1$).

On the other hand, texture values may be stored in one or more lookup tables 300. Such an embodiment may be especially advantageous for one-dimensional noise, depending upon hardware and software resource capabilities. The computations that would otherwise be performed for input pixel values may be saved in at least one lookup table 300 and blended in a single pass using a method similar to the one described in conjunction with FIG. 6. In other applications, noise function n may be implemented using a lookup table 300 that represents the two-dimensional texture, as was discussed in conjunction with FIG. 3A. A two-dimensional texture requires more memory to be allocated and thus may be less efficient than utilizing the two-dimensional texture as discussed above. For example, where extended range pixel texture values may be used that provide 64K indexing elements to a lookup table 300, a two-dimensional texture will require 256K entries. In many cases, it may be more efficient to utilize a two-dimensional texture to represent the noise function described above rather than a lookup table.

It may also be desirable in some applications to optimize the method for noise that repeats with a predetermined period. For example, a noise texture that repeats every 256 image pixel values may be optimized by taking advantage of a variety of aspects of graphics pipeline 17. For example, in many cases, graphics pipeline 17 permit 'folding' of values stored in a storage medium such as texture memory 80. In such applications, steps 206–214 may minimize the resources required and/or the number of passes required through graphics pipeline 17. For example in some cases, kernel function values and gradient values may be computed or retrieved using integers and fractional parts thereof. In addition, graphics pipeline 17 allows repetition of texture patterns. Thus, graphics pipeline 17 may allow reusability of the fractional texture patterns computed or retrieved, which may minimize the number of values needed to be computed.

As another example, this plurality of passes discussed above in conjunction with steps 206–214 may be performed in fewer passes through graphics pipeline 17 by combining operations. For example, these eight passes discussed above may be performed in one pass by, for example, enlarging lookup table 300 to accommodate all of the passes through graphics pipeline 17.

As another example, it may also be advantageous to save these randomly generated gradients for higher-order dimensional noise in one or more lookup tables to save memory and/or processing time. One method for such an implementation uses random offsets that may be used to use one-or two-dimensional gradient lookup tables as if they were higher-order dimensional tables. For example, a two-dimensional lookup table of noise values may be defined for a single value x as discussed above. A three-dimensional lookup table may also be represented as comprising a plurality of these two-dimensional lookup tables. For example, a random offset may be used to "shift" the values in the two-dimensional table so that neighboring planes may include the same, but shifted, values. This process avoids correlating values between each of these two-dimensional planes so that the gradient values remain random, and may be repeated indefinitely for the number of planes or dimensions needed. For example, a shift may be applied in a first (e.g., z) direction, and then another shift (e.g., in the t direction) may be applied to achieve a four-dimensional gradient lookup table. This process may be used to produce a one-dimensional lookup table 300.

In some applications, it may be more efficient to generate higher-dimensional noise functions utilizing a slightly different method to reduce the computing and/or memory resource requirements that would be necessary to implement higher-order dimensional noise using the methods described above for one- or two-dimensional noise. For example, in some applications, the resource requirements may be reduced by a factor of three to four. To illustrate, three-dimensional noise may be generated by using one or more of the color channels to represent each of the spatial dimensions x,y,z, rather than representing color components. That is, each color channel may be used to represent a directional one-dimensional texture in each of coordinates x,y,z using a coordinate system which the image is defined. These one-dimensional textures may then be blended together to provide a three-dimensional noise function. Similarly, the alpha channel may be used to provide an additional dimension to produce four-dimensional noise. Thus, the four channels (e.g., red, blue, green, and alpha) may each represent one-dimensional textures that may be blended to provide a four-dimensional noise function.

This color-channel implementation generates three- and four-dimensional functions by a fourth-order blend of eight or sixteen colors, respectively, from a two-dimensional texture. Such an implementation may drastically reduce the computing and/or memory resource requirements necessary to implement higher-order dimensional noise using the method described above for one- or two-dimensional noise. For example, utilizing the method described above in steps 206–214 for one- or two-dimensional noise would require a fourth-order blend of twenty-four or sixty-four colors, respectively, from a two-dimensional texture.

Any of the above-described noise functions may be generated for color as well as monochromatic images. Efficiency may be improved by producing all three channels approximately simultaneously. Another method for generating these noise functions may include performing the method once per pixel color value. For example, the method may be performed three times to provide noise values for three pixel color values.

Figure 5A:
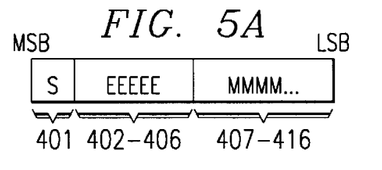
FIGS. 5A and 5B graphically illustrate examples of extended range pixel data.
Figure 5B:
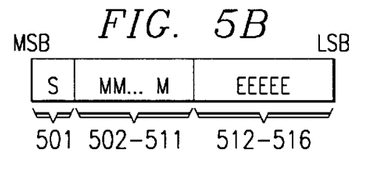

Bits of image pixel values may be preserved in this process to improve computational accuracy within graphics pipeline 17. For example, noise textures may be applied to objects using interface 15 and retaining floating point pixel values rather than fixed-point data restricted to a range between zero to one. These higher-resolution values may improve the accuracy of the final appearance. Two examples for such higher-resolution values are discussed in further detail in conjunction with FIGS. 5A and 5B. One example of a method that may be used to represent extended range textures is graphically illustrated in conjunction with FIG. 6. Any number of bits may be used to represent these pixel values. For example, one method for representing pixel data values may use a signed floating point system with a plurality of bits that may be divided between a sign portion, a mantissa portion, and an exponent portion. Furthermore, the arrangement of the plurality of bits may vary as desired. Two examples are illustrated in FIGS. 5A and 5B and are used to illustrate one aspect of the invention. These pixel values include ten mantissa bits and five exponent bits. Where the exponent portion is biased from values between −16 and +15, the pixel values may range between −64K to +64K. The invention contemplates fewer or more total bits, mantissa bits, and/or exponent bits, and other arrangements for sign, mantissa, and exponent bits that may be suitable for a desired application and/or implementation.

FIG. 5A graphically illustrates one example of an extended range pixel representation where a pixel value may be represented by sixteen bits 401–416. Bits 401–416 range from a most significant bit (MSB) 401 to a least significant bit (LSB) 416. As illustrated in FIG. 5A, MSB 401 may be used as a sign bit. The next five most significant bits 402–406 may be used as exponent bits and bits 407–416 may be used as mantissa bits.

FIG. 5B graphically illustrates another example of an extended range pixel representation where a pixel value may be represented by sixteen bits 501–516. Bits 501–516 range from a most significant bit (MSB) 501 to a least significant bit (LSB) 516. As illustrated in FIGURE 5B, MSB 501 may be used as a sign bit. In this embodiment, the next ten most significant bits 502–511 may be used as mantissa bits, and bits 512–516 may be used as exponent bits.

FIG. 6 graphically illustrates an example of a lookup table 300 in which pixel texture data may be represented. Lookup table 300 may be used to represent a one-dimensional texture that may be applied to pixel values x within a region 72 of an image. A texture value is typically applied to pixel values x in frame buffer 70. A noise function n=noise(x) such as those discussed in conjunction with FIGS. 2A–4 may be implemented as a texture having one or more dimensions by use of lookup table 300. Use of lookup table 300 may improve processing speed and minimize the loss of precision that would otherwise result from clamping of pixel values in graphics accelerator module 17. The function sine will be used with a sixteen-bit extended range pixel value to illustrate one aspect of the present invention.

For each value x in region 72, a new texture value n=noise(x) may be applied thereto. Lookup table 300 includes extended range texture values for each pixel operation n=noise(x). That is, each x value entry may be used as an index to the contents of lookup table 300 that correspond to the texture values for that x entry, in this case a value of noise(x). In this embodiment, lookup table 300 includes 128K entries, one entry for each bit combination of sixteen-bit extended range pixel values x.

Lookup table 300 may be downloaded into pixel operations module 40 and/or saved in texture memory 80. For example, texture may be applied while image data is processed in rasterization module 50 and/or frame buffer 70 by utilizing lookup table 300 stored in either texture memory 80 or pixel operations module 40. In addition, a plurality of lookup tables 300 may be implemented for some or all monadic functions that may be used to alter the appearance of image data.

In addition, lookup table 300 may also utilize a subset of the one-dimensional texture that is represented by the 128K entries illustrated in FIG. 6. For example, lookup table 300 may also be implemented utilizing a selected majority of MSBs where the desired detail in texture may not require differentiation between one or more LSBs. To illustrate, lookup table 300 may include only those combinations that utilize seven of the most significant mantissa bits as illustrated in FIG. 5B, reducing the number of entries from 128K by 16K. Reducing the number of entries for lookup table 300 may desirably reduce memory and/or processing requirements.

The invention contemplates a variety of methods for implementing lookup table 300. For example, lookup table 300 may be implemented in firmware or software and/or in data structures such as tables, files, databases, or the like. Lookup table 300 may be implemented by using an interface 15 such as OPENGL® or DIRECT3D®. For example, an application program 11 that utilizes the RenderMan shading language may use an OPENGL® PixelCopy call with pixel texgen bits enabled to invoke the indexed value n=noise(x) within lookup table 300.

Thus, it is apparent that there has been provided in accordance with the present invention, a method and system for accelerating noise that satisfies the advantages set forth above. Although the present invention has been described in detail, it should be understood that various changes, substitutions, and alterations may be readily ascertainable by those skilled in the art and may be made herein without departing from the spirit and scope of the present invention as defined in the following claims.

What is claimed is:

1. A method for accelerating noise, comprising:
   determining a first noise value based on a first noise function;
   determining a second noise value based on a second noise function;
   determining a noise texture value based on the first noise value and the second noise value; and
   assigning a randomly generated gradient value to one of the group consisting of a color channel and an alpha channel in a graphics pipeline, assigning a kernel value to the alpha channel corresponding to the color channel if the gradient value was assigned to the color channel, else if the gradient value was assigned to the alpha channel then assigning the kernel value to the color channel corresponding to the alpha channel, and blending the gradient value with the kernel value to produce the noise texture value.

2. The method as recited in claim 1, wherein determining the noise texture value is performed in a graphics pipeline.

3. The method as recited in claim 1, wherein determining the noise texture value is performed in a single pass through a graphics pipeline.

4. The method as recited in claim 1, wherein determining the noise texture value is performed by invoking a graphics pipeline via a graphic system interface as a single-instruction multiple-data computing surface.

5. The method as recited in claim 1, wherein determining the first and second noise values and determining the noise texture value is performed by invoking a graphics pipeline via a graphic system interface as a single-instruction multiple-data computing surface.

6. The method as recited in claim 1, wherein determining the noise texture value comprises:
   scaling the first noise value and the second noise value by corresponding gradient values; and
   determining the noise texture value based on the scaled first noise value and the scaled second noise value.

7. The method as recited in claim 1, further comprising indexing the noise texture value as a texture having one or more dimensions in a lookup table.

8. The method as recited in claim 1, further comprising blending additional gradient values in additional color channels in the graphics pipeline to produce a plurality of noise texture values for additional noise texture spatial dimensions.

9. The method as recited in claim 8, further comprising assigning the randomly generated gradient values to a plurality of color channels in the graphics pipeline for a plurality of spatial dimensions.

10. A method for accelerating noise, comprising:
blending an image pixel value with a first noise function to yield a first stage result;
blending the image pixel value with a second noise function to yield a second stage result;
blending the first stage result and the second stage result to yield a textured image pixel value; and
assigning a randomly generated gradient value to one of the group consisting of a color channel and an alpha channel in a graphics pipeline, assigning a kernel value to the alpha channel corresponding to the color channel if the gradient value was assigned to the color channel, else if the gradient value was assigned to the alpha channel then assigning the kernel value to the color channel corresponding to the alpha channel, and blending the gradient value with the kernel value to produce the noise texture value.

11. The method as recited in claim 10, wherein blending the first stage result and the second stage result is performed by invoking a graphics pipeline via a graphic system interface as a single-instruction multiple-data computing surface.

12. The method as recited in claim 10, wherein:
blending the image pixel value with a first noise function comprises scaling a first noise value determined from the first noise function by a corresponding first gradient value; and
blending the image pixel value with a second noise function comprises scaling a second noise value determined from the second noise function by a corresponding second gradient value.

13. A computer-readable medium having computer-readable instructions thereon for accelerating noise, the computer-readable instructions when executed on a processor causing the processor to perform:
invoking a graphics pipeline to perform:
determining a first noise value based on a first noise function;
determining a second noise value based on a second noise function;
determining a noise texture value based on the first noise value and the second noise value; and
assigning a randomly generated gradient value to one of the group consisting of a color channel and an alpha channel in a graphics pipeline, assigning a kernel value to the alpha channel corresponding to the color channel if the gradient value was assigned to the color channel, else if the gradient value was assigned to the alpha channel then assigning the kernel value to the color channel corresponding to the alpha channel, and blending the gradient value with the kernel value to produce the noise texture value.

14. The computer-readable medium as recited in claim 13, wherein determining the noise texture value is performed in a single pass through the graphics pipeline.

15. The computer-readable medium as recited in claim 13, wherein invoking the graphics pipeline comprises invoking the graphics pipeline via a graphic system interface as a single-instruction multiple-data computing surface.

16. The computer-readable medium as recited in claim 13, wherein determining the noise texture value comprises:
scaling the first noise value and the second noise value by corresponding gradient values; and
determining the noise texture value based on the scaled first noise value and the scaled second noise value.

17. The computer-readable medium as recited in claim 13, wherein the processor further invokes the graphics pipeline to perform blending additional gradient values in additional color channels in the graphics pipeline to produce a plurality of noise texture values for additional noise texture spatial dimensions.

18. The computer-readable medium as recited in claim 17, wherein the processor further invokes the graphics pipeline to perform assigning the randomly generated gradient values to a plurality of color channels in the graphics pipeline for a plurality of spatial dimensions.

19. A computer-readable medium having computer-readable instructions thereon for accelerating noise, the computer-readable instructions when executed on a processor causing the processor to perform:
invoking a graphics pipeline to perform:
blending an image pixel value with a first noise function to yield a first stage result;
blending the image pixel value with a second noise function to yield a second stage result;
blending the first stage result and the second stage result to yield a textured image pixel value; and
assigning a randomly generated gradient value to one of the group consisting of a color channel and an alpha channel in a graphics pipeline, assigning a kernel value to the alpha channel corresponding to the color channel if the gradient value was assigned to the color channel, else if the gradient value was assigned to the alpha channel then assigning the kernel value to the color channel corresponding to the alpha channel, and blending the gradient value with the kernel value to produce the noise texture value.

20. The computer-readable medium as recited in claim 19, wherein blending the first stage result and the second stage result is performed by invoking the graphics pipeline via a graphic system interface as a single-instruction multiple-data computing surface.

21. The computer-readable medium as recited in claim 19, wherein:
blending the image pixel value with a first noise function comprises scaling a first noise value determined from the first noise function by a corresponding first gradient value; and
blending the image pixel value with a second noise function comprises scaling a second noise value determined from the second noise function by a corresponding second gradient value.

22. A system for accelerating noise, comprising:
a graphics pipeline comprising a frame buffer; and
a host in communication with the graphics pipeline, the host operable to invoke the graphics pipeline to perform:
determining a first noise value based on a first noise function;
determining a second noise value based on a second noise function;
determining a noise texture value based on the first noise value and the second noise value, wherein one of the graphics pipeline and the host is further operable to assign a randomly generated gradient value to one of the group consisting of a color channel and an alpha channel in the graphics pipeline, assign a kernel value to the alpha channel corresponding to the color channel if the gradient value was assigned to the color channel, else if the gradient value was assigned to the alpha channel then assign the kernel value to the color channel corresponding to the alpha channel, and cause the gradient value to be blended with the kernel value to produce the noise texture value.

23. The system as recited in claim 22, further comprising a lookup table in a memory coupled to the frame buffer, the lookup table indexes determined noise texture values as a texture having one or more dimensions.

24. The system as recited in claim 22, further comprising a graphics system interface in communication between the host and the graphics pipeline, and wherein the host invokes the graphics pipeline as a single-instruction multiple-data computing surface via the graphic system interface.

25. The system as recited in claim 22, wherein one of the graphics pipeline and the host is further operable to blend the alpha channel with one of a plurality of color channels.

26. The system as recited in claim 22, wherein one of the graphics pipeline and the host is further operable to assign the randomly generated gradient values to a plurality of color channels in the graphics pipeline for a plurality of spatial dimensions.

27. The system as recited in claim 22, wherein the graphics pipeline further comprises a texture memory that stores an image pixel value.

28. A system for accelerating noise, comprising:
  a graphics pipeline comprising a frame buffer; and
  a host in communication with the graphics pipeline, the host operable to invoke the graphics pipeline to perform:
    blending an image pixel value with a first noise function to yield a first stage result;
    blending the image pixel value with a second noise function to yield a second stage result;
    blending the first stage result and the second stage result to yield a textured image pixel value, wherein one of the graphics pipeline and the host is further operable to assign a randomly generated gradient value to one of the group consisting of a color channel and an alpha channel in the graphics pipeline, assign a kernel value to the alpha channel corresponding to the color channel if the gradient value was assigned to the color channel, else if the gradient value was assigned to the alpha channel then assign the kernel value to the color channel corresponding to the alpha channel, and cause the gradient value to be blended with the kernel value to produce the noise texture value.

29. The system as recited in claim 28, further comprising a graphics system interface in communication between the host and the graphics pipeline, and wherein the host invokes the graphics pipeline as a single-instruction multiple-data computing surface via the graphic system interface.

30. The system as recited in claim 28, wherein one of the graphics pipeline and the host is further operable to blend the alpha channel with one of a plurality of color channels.

31. The system as recited in claim 28, wherein one of the graphics pipeline and the host is further operable to assign the randomly generated gradient values to a plurality of color channels in the graphics pipeline for a plurality of spatial dimensions.

32. The system as recited in claim 28, wherein the graphics pipeline further comprises a texture memory that stores the image pixel value and the first stage result.

* * * * *

UNITED STATES PATENT AND TRADEMARK OFFICE
CERTIFICATE OF CORRECTION

PATENT NO. : 6,747,660 B1  Page 1 of 1
APPLICATION NO. : 09/569521
DATED : June 8, 2004
INVENTOR(S) : Thomas M. Olano It is certified that error appears in the above-identified patent and that said Letters Patent is hereby corrected as shown below:

| COLUMN | LINE | ERROR |
|---|---|---|
| 4 | 4 | Delete "26" and insert -- 20 --, therefore. |
| 6 | 67 | Delete "$X_n=0$" and insert -- $X_1=0$ --, therefore. |
| 11 | 10 | Delete "a$_0$" and insert -- á$_0$ --, therefore. |
| 13 | 20 | Delete "SB" and insert -- 5B --, therefore. |

Signed and Sealed this

First Day of April, 2008

JON W. DUDAS
*Director of the United States Patent and Trademark Office*